(12) United States Patent
Sammis et al.

(10) Patent No.: US 7,839,513 B2
(45) Date of Patent: Nov. 23, 2010

(54) HYBRID DOCUMENT AUTOMATION SYSTEM

(75) Inventors: Ojeni P. Sammis, Glendale, CA (US); Peter S. Fisher, Pasadena, CA (US); Lily A. Ray, Altadena, CA (US); Alexandra D. Ruegg, La Crescenta, CA (US); Alex C. Chen, Arcadia, CA (US); Vazrik Israelian, Glendale, CA (US); James R. Low, Rochester, NY (US); Richard T. Horn, Claremont, CA (US); Mike L Justice, Fredericksburg, VA (US)

(73) Assignee: Xerox Corporation, Norwalk, CT (US)

( * ) Notice: Subject to any disclaimer, the term of this patent is extended or adjusted under 35 U.S.C. 154(b) by 1320 days.

(21) Appl. No.: 10/910,413

(22) Filed: Aug. 3, 2004

(65) Prior Publication Data
US 2005/0185222 A1 Aug. 25, 2005

Related U.S. Application Data

(60) Provisional application No. 60/547,405, filed on Feb. 24, 2004.

(51) Int. Cl.
*G06K 15/00* (2006.01)
(52) U.S. Cl. .................... 358/1.14; 358/2.1; 358/1.9; 358/1.5; 382/100
(58) Field of Classification Search ....... 358/1.15–1.18; 156/350; 707/201; 399/82
See application file for complete search history.

(56) References Cited

U.S. PATENT DOCUMENTS

| 4,933,848 A | * | 6/1990 | Haderle et al. | 707/201 |
| 5,489,969 A | | 2/1996 | Soler et al. | |
| 5,705,020 A | * | 1/1998 | Chiari | 156/350 |
| 5,835,690 A | * | 11/1998 | Duniho | 358/1.16 |
| 5,859,711 A | * | 1/1999 | Barry et al. | 358/296 |
| 5,995,721 A | | 11/1999 | Rourke et al. | |
| 6,041,200 A | * | 3/2000 | Glass et al. | 399/82 |
| 6,373,586 B1 | * | 4/2002 | Kim | 358/1.15 |
| 6,462,756 B1 | * | 10/2002 | Hansen et al. | 715/764 |
| 6,825,943 B1 | * | 11/2004 | Barry et al. | 358/1.15 |
| 6,930,795 B1 | * | 8/2005 | Motamed et al. | 358/1.18 |
| 7,061,636 B2 | * | 6/2006 | Ryan et al. | 358/1.15 |
| 2003/0235448 A1 | * | 12/2003 | Nemura et al. | 399/389 |

* cited by examiner

*Primary Examiner*—King Y Poon
*Assistant Examiner*—Lennin Rodriguez
(74) *Attorney, Agent, or Firm*—Fay Sharpe LLP

(57) ABSTRACT

A hybrid document automation system manages a hybrid printing job, such as PostScript (PS) job with a mix of color and monochrome (B/W) sheets containing variable data. The print job may contain any number of sets, each differing in size and ratio of color and B/W sheets. The system includes a color printer, a monochrome printer, a print manager, a splitter for separating color pages from monochrome pages in the print job and automatic jam recovery. A graphical user interface (GUI) may be provided to give a user/operator information on the status of the print job. The system may also include a document integrity system for insuring the correct output of the merged color and monochrome pages.

13 Claims, 3 Drawing Sheets

HYBRID DOCUMENT AUTOMATION SYSTEM

CROSS REFERENCE TO RELATED APPLICATIONS

This application claims priority from co-pending provisional application No. 60/547,405 filed Feb. 24, 2004, to Ojeni P. Sammis et al. for "Hybrid Document Automation System", the contents of which are incorporated herein by reference.

FIELD OF THE INVENTION

This invention relates generally to automatic printing systems, and more particularly, to an automatic system for printing documents having a mix of color and black and white pages.

BACKGROUND OF THE INVENTION

Most digital hybrid documents have been produced either on a full color device, with the attendant cost of printing the monochrome portions at color rates, or they have been printed on separate color and monochrome devices and then manually collated into a complete document. Both methods are relatively costly and inefficient, making them appropriate only for short or infrequent hybrid jobs. In the first case, printing black and white pages on a color printer guarantees set and job integrity of the output. This is especially important with variable information (VI) documents such as 401(k) statements that usually differ in number of pages per set and necessarily vary in content. The downside of printing all pages on a color unit is that the black and white pages cost far more than on a monochrome printer.

In the second case, mere "job splitting" into color pages and monochrome pages is not a productive alternative for long or complex jobs. When the pages are manually merged after printing, there is significant risk of collation errors. If merging is accomplished on an offline high-speed collator, every jam results in a spoiled document and necessitates reprinting the set later. Feeding problems and page out-of-sequence conditions may cause intermixing of pages from different documents in the same set. Even if defective sets are caught, "splitting" provides no information for reprinting spoiled sets and sets with integrity errors.

What is needed is a printing system that enables users to split a print job between more cost effective color printers and monochrome printers without the above mentioned problems.

SUMMARY OF THE INVENTION

A hybrid document printing system, according to one aspect of the invention, includes a print manager for receiving a print job having multiple pages, wherein the print job includes at least one color page, and wherein the print job is provided in a page description language and a splitter, responsive to the print job, for splitting the print job into a color print job and a monochrome print job. The splitter parses the print job for a color element, and, upon identifying a color element on a page, the page is assigned to the color print job. The color print job includes all pages having at least one color element of a color other than black and the monochrome print job includes all remaining pages. In the case of a duplex job (printing on both sides of a sheet), if a color element is detected on the front page and no color elements are detected on the back page, both pages are marked as color. Similarly if a color element is detected only on the back page and none are detected on the front page, both pages are marked as color and put in the color print job.

The print manager provides the color print job to a color printer for printing the color print job and controls the color printer. When the color print job is completed, the print manager provides the monochrome print job to a monochrome printer for printing the monochrome print job. The output of the color printer is placed in a tray of an interposer located in the monochrome printer. The print manager may issued a job ticket which may be used to provide the commands to the monochrome printer to properly insert each color sheet in the interposer tray with the monochrome output.

The print job may be provided in any different page description language, for example, PostScript. In one embodiment using PostScript (wherein each page is independent), a set of PostScript set color operators may be prepended to the print job. The splitter parses the print job for a color set operator, wherein, upon identifying a color set operator on a page, the page is assigned to the color print job.

The printing system may include an optional integrity module for insuring that the color pages are correctly collated with the monochrome pages. In this embodiment, an integrity mark, such as an optical character recognition (OCR) line or other 1D or 2D symbology marks, is printed on each output page. If the integrity mark is an OCR line, the OCR line includes a unique ID for each page of output (and may also include a page number and total number of pages in the output set). A sensor, such as a camera or an OCR reader, is located within the output path of the monochrome printer for reading the OCR line on each page of output. If an error is detected, such as a missing page, or an out of sequence page, the integrity module halts printing of the monochrome printer.

A hybrid document printing system, according to another aspect of the invention, includes a print manager for receiving a print job having multiple sets, wherein the print set includes at least one color page, and wherein the print job is provided in a page description language; a splitter for splitting the print job into a color print job and a monochrome print job (one for each set), wherein the color print job includes all pages having at least one color element of a color other than black and the monochrome print job includes all remaining pages; a color printer and a monochrome printer. The color print job is printed first at the color printer and, when completed, the color output sheets are placed in an interposer tray of the monochrome printer. The print manager may issue a job ticket for each specific set which provides commands to the monochrome printer to properly insert each color sheet in the interposer tray with the monochrome output sheets output. The hybrid document printing system also includes apparatus for detecting color sheet jams in the interposer and an automatic jam recovery module. The automatic recovery module, located at the monochrome printer, upon detection of a color sheet jam, causes the interposer to purge all color sheets for the current set and to purge all sheets in the paper path. Then the monochrome printer cancels printing of the print set corresponding to the color sheet jam and resumes printing the next print set.

The hybrid document printing system provides techniques for ensuring an accurately split print job using two printers. For example, if the page description language is PostScript, splitting of the print job may be handled by prepending a set of redefinitions of the PostScript operators to the front of the PostScript print job file. When the resulting file is processed by a PostScript interpreter, these redefined operators cause records to be written to a file indicating which pages contain color. The prepended set of commands includes a PostScript command that prevents the marking of paper by redirecting the print stream to a "null device."

Automatic jam recovery is accomplished at the tray level within the monochrome printer. A color sheet jam is detected using special hardware that tracks color sheets pulled from the interposer. A separate software module controls jam recovery and includes an algorithm which causes the interposer to purge all color sheets for the current set when the monochrome printer purges all the sheets in the paper path. For example, if a print set includes 15 sheets of color output to be interposed with 40 sheets of monochrome output and the jam occurs at color sheet 13 and monochrome sheet 20, the remaining 2 sheets in the interposer are purged as well as any sheets in the paper path. The print set is marked cancelled. The jam recovery module causes the monochrome printer to resume printing the next valid print set; it does not recover the current print set. The print manager identifies the spoiled set for reprinting based on the status of the set assigned.

A document integrity module ensures that all pages of a print set have been printed and in the correct order. A document integrity module is located on the monochrome printer. Each printed sheet contains integrity marks to ensure order, for example, a string printed using an OCR font (an OCR line). A sensor, such as a camera, reads the integrity marks on each output sheet and detects if the sheet is out of order. If the sheets are out of order, the integrity module signals the monochrome printer which halts printing. The OCR line contains a unique ID, sheet number and total number of sheets within a file. The print manager may also track all printed jobs and generate a report listing any spoiled sets as well as the total number of set(s) in the job, number of successfully print sets and number of spoiled set(s).

DETAILED DESCRIPTION OF THE EMBODIMENTS

A hybrid document automation system (HDAS system), according to the invention, manages a hybrid printing job, such as PostScript (PS) job with a mix of color and monochrome (B/W) sheets containing variable data. The print job may contain any number of sets, each differing in size and ratio of color and B/W sheets. The system includes a color printer, a monochrome printer, a print manager, a splitter for separating color pages from monochrome pages in the print job and automatic jam recovery. A graphical user interface (GUI) (or some other means of providing print job status such as an email, signal lights on the printer panel, etc.) provides a user/operator with information on the status of the print job. The system may also include a Document Integrity Subsystem (DIS) for insuring the correct output of the merged color and monochrome pages. If the (DIS) is part of the HDAS system, integrity marks, such as optical character recognition (OCR) marks, can be automatically inserted by HDAS on every sheet.

The system may be implemented as a software solution and installed on a separate hardware controller or installed on the controller of the monochrome printer with an interposer. For example, the system may be installed on the DT61xx DocuSP controller (SunBlade 1000 or above). The system may be used with different color printers and monochrome printers. For example, the system may be used with a Xerox monochrome DT6180 and a Xerox color printer powered by DocuSP or a third party controller. The color printer may be DC6060, DC5252 or iGen3. For convenience, the system will be described with respect to one or more of the above Xerox printers. The HDAS system supports one pair of printers: a color printer and a monochrome printer, but may be configured to support additional printers in the event a print job must be split among multiple color printers or multiple monochrome printers.

Figure 1:
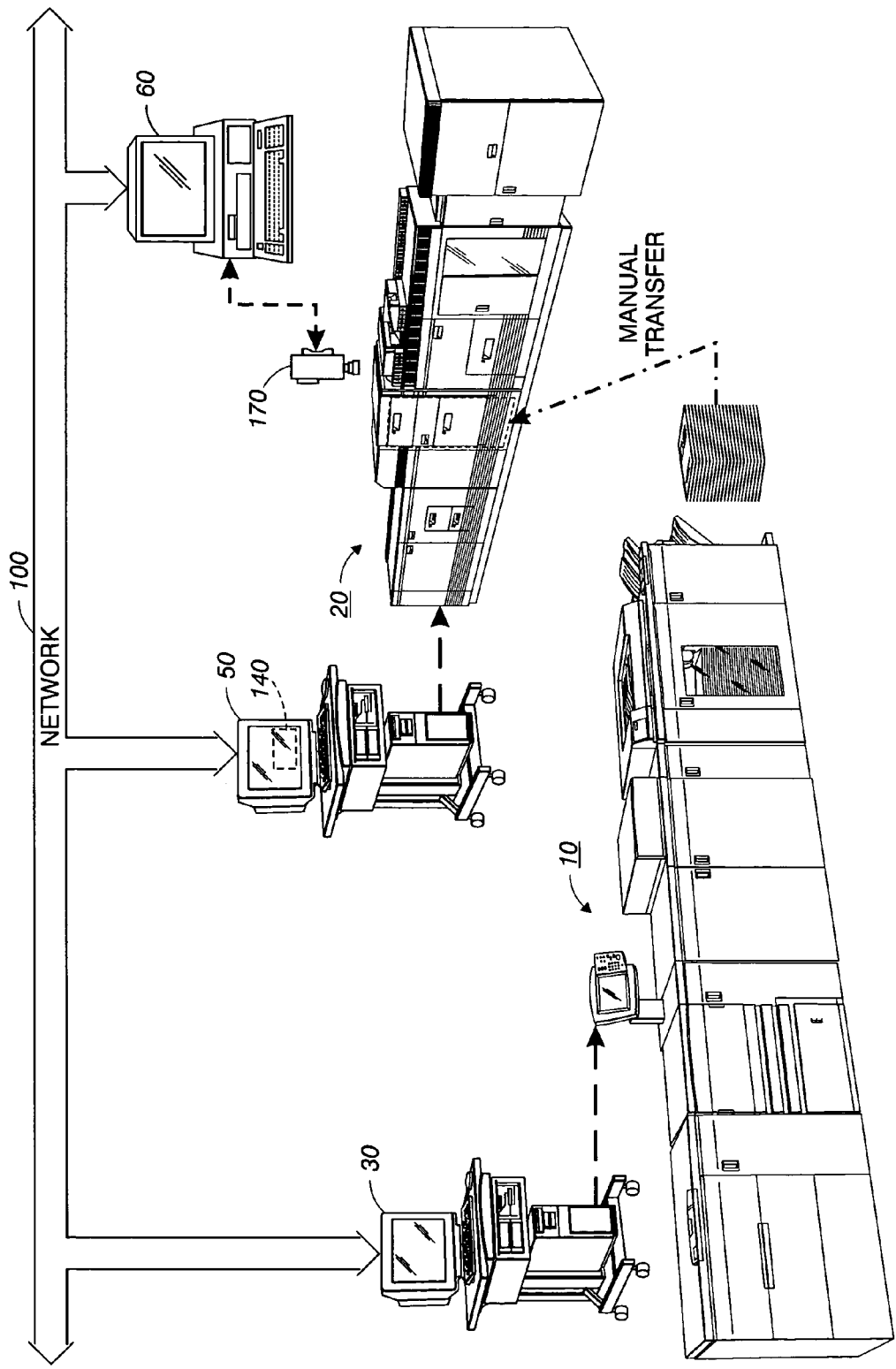
FIG. 1 is diagram of a hybrid document automation system.

Referring to FIG. 1, a hybrid document automation system (HDAS) is configured to control a monochrome printer 20, such as a Xerox DocuTech printer, and a color printer 10 such as a Xerox DocuColor printer, both with DocuSP controllers. Monochrome printer 20 has its DocuSP controller located on a separate workstation 50, which is shown as having a Sun platform. Color printer 10 has its controller 30 located on a separate workstation (note that the controller 30 may be a DocuSP, Creo or EFI DFE). The workstations and printers are connected to a network 100. The HDAS print manager 140 is implemented as a software solution which runs on DocuSP controller 50. Collocated with print manager 140 are a Graphical User Interface (GUI) for displaying system status and messages to a user/operator on the workstation 50 and a print job splitter.

The system takes as input, for example, documents that conform to the standard for Page Independent PostScript as described in the Adobe Document Structuring Conventions Specification (version 3, 1992). The PostScript file may be a single document or it may be composed of a number of sets. Each set may contain variable data of a customer document. The number of color or black and white pages in each set may be different. Documents may be duplex; either side of a duplex page may contain color. The system assumes that a page image will cover the entire side of a sheet, that is, it will not recognize n-up imposition. A page is defined as an image on one side of the sheet. Duplex includes two pages (front and back) on a single sheet. If color is detected on either side of a sheet then it will be printed on the color printer. Sets within a PostScript document may be recognized by detecting a set-pagedevice PostScript operator with specific operands (such as/Staple 0).

A page independent PostScript file is sent to the DocuTech DocuSP Controller 50 where the HDAS system splitter extracts the color pages. The HDAS system print manager 140 analyzes the print job that contains either one set or multiple sets of print jobs batched together as one print job. The splitter splits the print job into two print streams: one for color sheets and one for the monochrome sheets. All color sheets in a batch are printed together as a single print job. The HDAS system print manager sends the color pages to color printer 10 with a banner page that identifies the print job. When the color printing is complete, an operator moves the stack of color pages from the color printer 10 to a tray 220 in the interposer 240 in monochrome printer 20 (see also FIG. 3). Once the interposer is loaded with the preprinted color sheets, the operator releases the monochrome job from the HDAS system GUI. The GUI issues a command to the print manager, which then releases separate jobs with a new job ticket for each respective B/W portions to the 61xx monochrome printer. Then the job completes printing on the monochrome printer with the color pages inserted in their proper position within the output document. Both the number of color and the number of black and white sheets can vary in each set.

In case a paper jam occurs while any of the color sheets are in the paper path, the system will recover to the next set boundary. Jam recovery will purge the remaining color sheets from the interposer tray and recover to the next set. If a jam occurs on the black and white pagers, then spoiled pages will be reprinted automatically to produce a valid set. At the conclusion of the print file the system print manager generates a report stating the total number of sets in the print job, the total number of successfully printed sets and identifies the number of spoiled sets.

Figure 3:
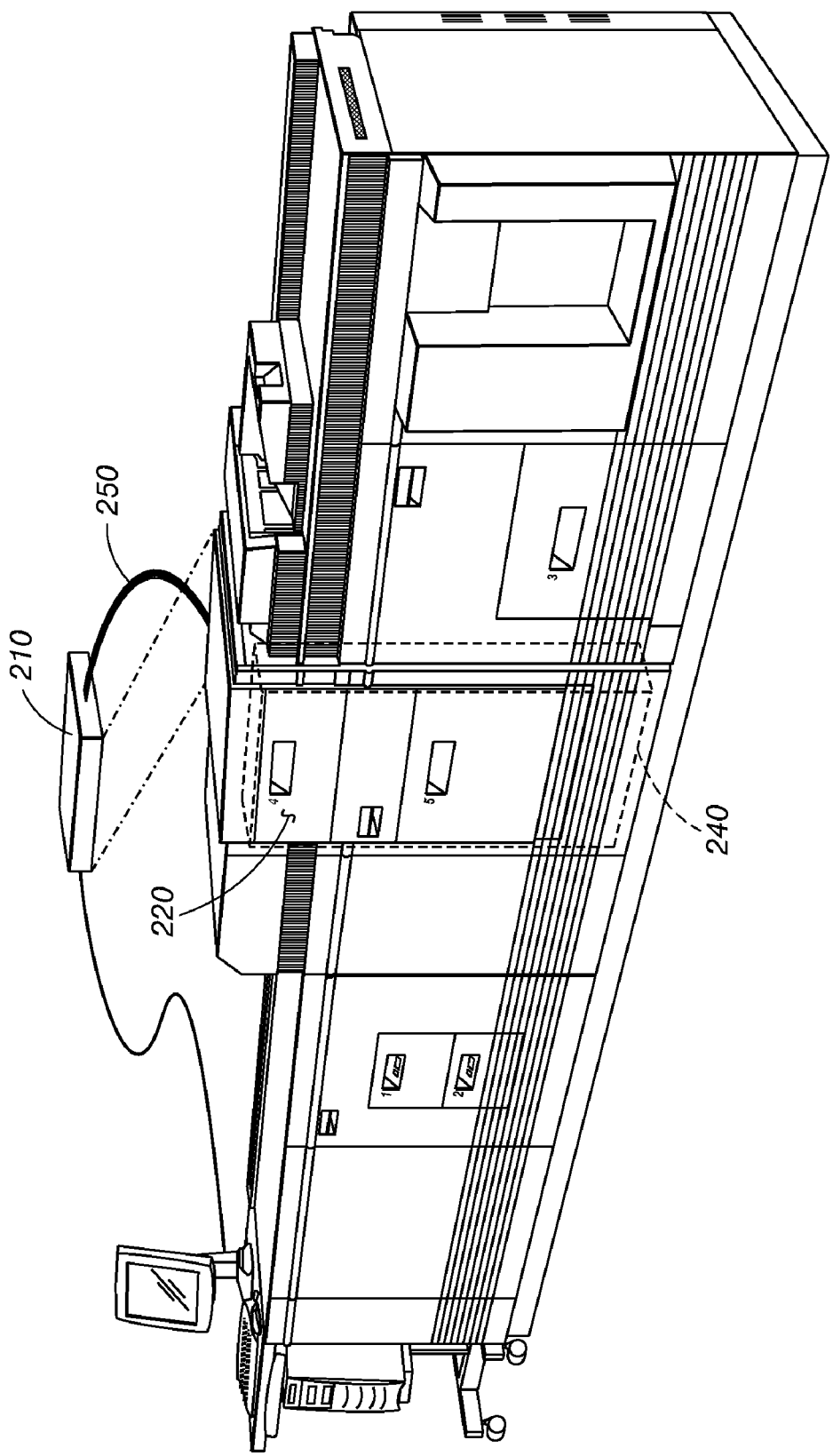
FIG. 3 is a block diagram of a monochrome printer with automatic jam recovery.

Automatic jam recovery is accomplished at the tray level within the monochrome printer 20. Referring to FIG. 3, a color sheet jam is detected using hardware 250 that tracks color sheets pulled from the interposer 240. A separate software module 210 controls jam recovery for color sheets and includes an algorithm which causes the interposer 240 to purge all color sheets for the current set when the monochrome printer 20 purges all the sheets in the paper path. For example, if a print set includes 15 sheets of color output to be interposed with 40 sheets of monochrome output and the jam occurs at color sheet 13 and monochrome sheet 20, the remaining 2 sheets in the interposer are purged as well as any sheets in the paper path. The set is marked cancelled. The jam recovery module causes the monochrome printer to resume printing the next valid print set (i.e., begin at sheet 1); it does not recover the current print set. The print manager identifies the spoiled set for reprinting based on the status of the set assigned.

With the capacity for multiple levels of integrity checking, in real-time, the system can prevent such problems as customer A's 401(k) document color pages being inserted into customer B's 401(k) document. This helps to protect customer relationships and avoid legal ramifications. Once the document is output, the system will report it as completed. The correctly collated set is ready for further finishing. Various in-line or off-line finishing options may be provided depending on customer requirements (i.e., perfect bound documents, stitched documents, etc.).

An optional document integrity module ensures that all output pages are in the print set and in the correct order. The document integrity module contains a camera (OCR or integrity mark reader) 170 that may be mounted on the output of the monochrome printer's bypass transport for external finishing or after the interposer in the case of internal printer finishing option. To support the camera subsystem, associated software may be installed on integrity controller 60. The document integrity module relies on integrity marks in the print job that contains a unique ID and sheet number of each sheet. The unique sheet identifiers must be printed on every sheet. The document integrity module checks every sheet number by scanning the integrity mark to ensure that sheets are in the correct order. The document integrity module also reads the set number to ensure that the color and monochrome pages are for the same account, job, or customer. If the integrity system finds that the sheets are out of order or missing, it stops the printer and a warning message on the integrity controller advises the operator of an integrity fault. The operator follows instructions to remove the faulted sheets, cancel the faulted job and continue the operation. The system print manager then identifies the spoiled set as an incomplete job in its status report.

One implementation of the document integrity module includes a string of 19 numeric characters stretching to maximum of 1 inch using an OCR font. The first 13 digits hold the Set Identifier which will simply be monotonically increasing numbers starting from 1. Characters 14-19 hold the sequence number within the set: three characters for the current page number and three characters for the total number of pages in the set. The document integrity module will also accept 1D or 2D symbologies as an option (such as Barcode or DataMatrix). An OCR (text line) representation may be the preferred method for one customer and a bar code or DataMatrix for another. In either case, the definition of the integrity marks and the integrity rule may be changed in the document integrity module software. In addition, the HDAS software allows the redefinition of the integrity marks as well as page placement, for example, the font to use and the X and Y page coordinates. In the case of an OCR font, the following three examples are possible ways of representing the integrity rule:

0000000000005001019
customer 5, sheet 1 of 19 (13 spaces for the ID, up to 999 set & pg count)
pg 01 of 19 0000005
customer 5, pg 1 of 19 (7 spaces for customer ID, up to 99 set & pg count)
pg 001 of 019-00000005
Page 1 of 19, customer 5 (8 spaces for the ID, up to 999 set & pg count)

To accommodate insertion of preprinted inserts into a set, a predefined character string that will be ignored by the document integrity module such as, all zeros, may be used. The integrity mark reader may be physically mounted such that it is capable of moving across the page. The reader may be located at the output of the Bypass Transport or the output of the interposer.

The HDAS system has been implemented to accept an input document to conform to the PostScript Document structuring conventions. As discussed in Chapter 3 of the PostScript Language Reference Manual, Second Edition, the PostScript™ language standard does not specify the overall structure of a PostScript language program. Any sequence of tokens conforming to the syntax and semantics of the PostScript language is a valid program that may be presented to a PostScript interpreter for execution. For a PostScript language program that is a page description (in other words, a description of a printable document), it is often required to impose an overall program structure. Use of the document structuring conventions not only helps assure that a document is device independent, it allows PostScript language programs to communicate their document structure and printing requirements to document managers in a way that does not affect the PostScript language page description.

Figure 2:
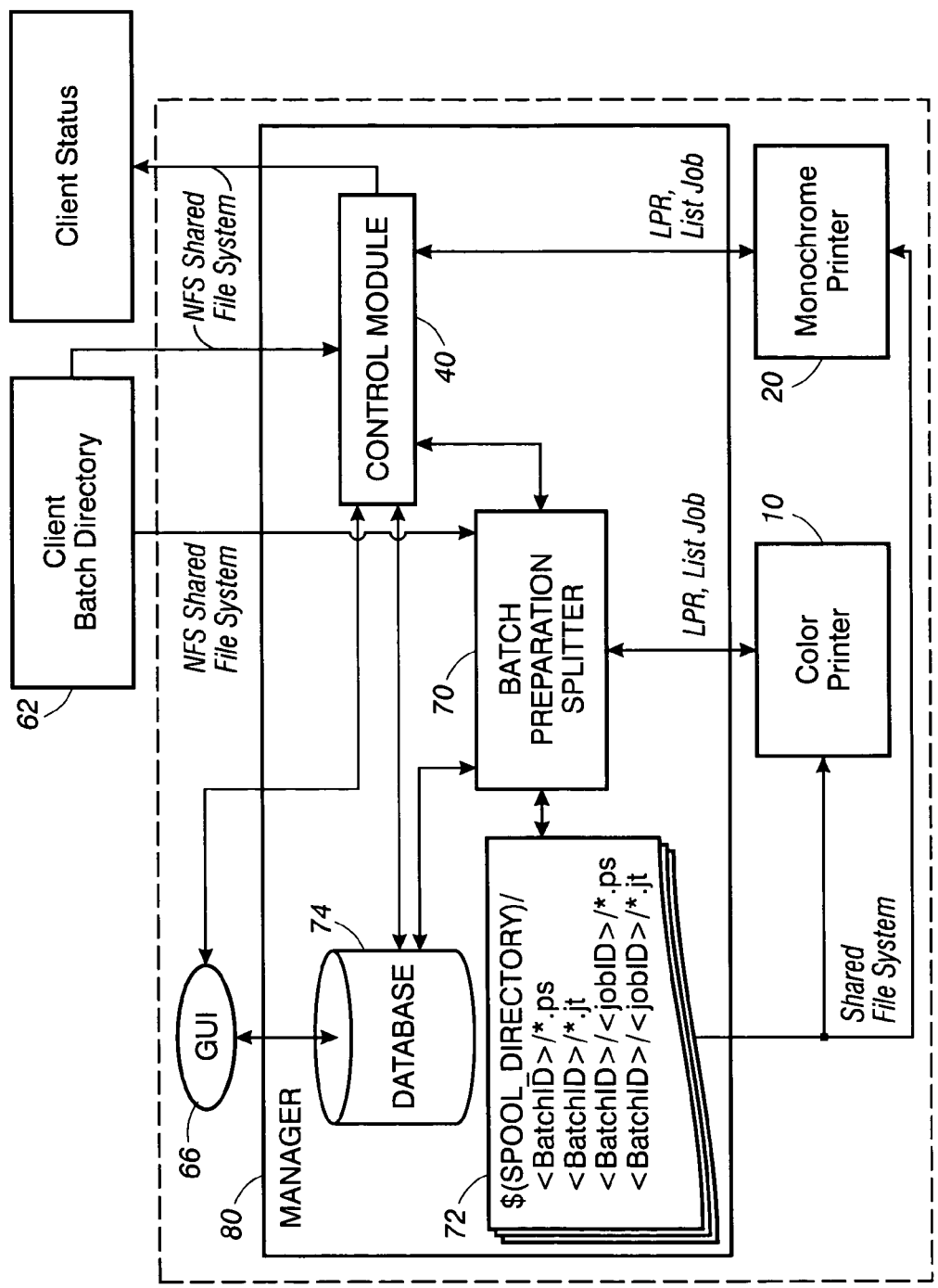
FIG. 2 is a block diagram of an architecture used by the print manager.

Pages should not have any inter-dependencies. Each page may rely on certain PostScript language operations defined in the document prolog or in the document setup section, but it is not acceptable to have any graphics state set in one page of a document on which another page in the same document relies on. It is also risky to re-impose or rely on a state defined in the document setup section; the graphics state should only be added to or modified, not re-imposed. See Appendix I of the PostScript Language Reference Manual, Second Edition for more details on proper preservation of the graphics state with operators like settransfer. For the most part, page independence can be achieved by placing a save-restore pair around each page, as shown below:

%!PS-Adobe-3.0
. . . Header comments, prolog definitions, document setup
. . . %% Page: cover 1
%% BeginPageSetup/pgsave save def
. . . PostScript language instructions to perform page setup
. . . %% EndPageSetup ... PostScript language instructions to mark page 1
... pgsave restore showpage
... Rest of the document ...
%% EOF FIG. 2 is a block diagram of the HDAS system architecture. HDAS manager 80 includes a database 74 for storing print job information, a control module 40 and a splitter module 70. Control module 40 takes as input a print job from Client batch directory 62. The control module 40 initially moves the print job from Client batch directory 62 to the spool directory 72 and is handed off to the splitter 70. The splitter 70 takes the print job from spool directory 72, saves the information in database 74 about the print job and generates two output jobs in the spool directory 72: a color job and a monochrome job for each set within the print job. The color job is sent to color printer 10, using the standard 1pr command, where the job is printed. Upon completion of the color printing job, control module 40 provides status to the user/operator via the GUI 66. The operator moves the output color sheets to the interposer tray in the monochrome printer and notifies the control module 40 through the GUI 66 that the monochrome job is ready for final printing. Control module 40 creates job tickets for each monochrome job and, using the standard 1pr command, sends the job ticket in the spool directory 72 for this set to monochrome printer 20, where monochrome pages and color pages are merged to produce a complete set. By communicating with the printer, the control module 40 creates a first-in, first-out print stream. In this manner, the control module 40 insures that the color pages for a specific set are merged with their corresponding monochrome pages. The HDAS banner sheet is printed on the monochrome printer after the final set is complete.

The HDAS system provides a solution for customers needing to add color to their documents when it makes economical sense to print the majority of B/W pages on a monochrome printer at a fraction of the cost of a color printer. For document integrity, Customers can add tracking data (such as account #, page in set) to each sheet in job. The data is printed as an OCR line or other symbology for use in the Document Integrity Subsystem. The HDAS Print Manger is the traffic director that promotes the print job processing from analysis, using the PostScript interpreter, to separating the color and black and white sheets, using the splitter, to sending and monitoring the print requests at the printers. The color portion is printed on DocuColor printer. The printed color portion is loaded into DocuTech Interposer. The Operator requests final printing using the HDAS GUI where the monochrome portion of the job is merged with the color portion. The Print Manager issues print requests to the monochrome printer in set sequence and polls the printer for status of each print request. Document Integrity Subsystem module validates correct document contents by checking the integrity marks on color and B&W pages (stops if sheets are out of order or incorrectly oriented, and operator is notified). Documents may be stacked for offline finishing, finished internally (in the DocuTech tape binder or stitcher) or sent to an inline finisher via the Bypass Transport. HDAS Print Manager generates a report stating total number of printed sets and number of valid sets, and lists any spoiled sets.

The HDAS system manages a hybrid print job by processing, splitting, printing respective color and monochrome sheets on corresponding color and monochrome printers; it can also collate the sets, manages jams and has an optional integrity system to assure delivery of a reliable output set. The following describes the flow from when a PS file is submitted to the HDAS system, and how it is processed, printed and managed. HDAS accepts a Well Formed PS file. HDAS preprocesses and generates an output file as described above. HDAS uses the original PS and the new output file to create a new PostScript file containing special hints for further processing. HDAS Batch Preparation and Splitter module generates two print streams for the color and the monochrome printers. The Print Manager takes control of the print jobs. This includes job submission to the appropriate printer, inquiries, processing commands from the GUI, and maintaining a database. Color Job with an identifying banner page is submitted to the color printer. The operator inserts the printed color sheets in the DocuTech interposer and requests printing of the monochrome portion via the HDAS GUI. The GUI communicates the request to the Print Manager. The Print Manager creates and submits new job ticket(s) for each respective B/W portion of the original job to the DocuTech. The job ticket contains appropriate commands to pull the color sheets from the interposer. As the printed sheets pass through the Bypass Transport for external stacking the HDAS Document Integrity subsystem verifies the page order as described above. If a color sheet jams in the DocuTech the recovery follows a unique path described above. The DocuTech follows standard procedure to recover from jams on the B/W sheets. Upon completion of the monochrome job the Print Manager generates the report as described above.

The system has been described with the color pages being printed before the black and white pages. Clearly, the black and white pages could be printed before the color pages, placed in the interposer and inserted in their proper position within the output document as the color printer prints its portion of the print job.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A hybrid document printing system for printing a single job using a color printer and a monochrome printer, comprising:
   a splitter for parsing multiple jobs into a first collective group of colored pages and a second group including monochrome pages segmented by tickets corresponding to each one job of the multiple jobs;
   a first color printer for printing the first collective group to produce colored output, the first color printer also printing a banner page identifying the each one job and an integrity mark on each one page of the colored output;
   a tray for placing the colored output in a feeder;
   a second monochrome printer for printing monochrome output for the second group,
   an interposer for interposing the colored pages into proper placement in the monochrome output to reassemble the each one print job of the multiple jobs;
   an integrity mark sensor included after an output path of the second monochrome printer for reading the integrity mark on the each one page of colored output as the colored output is fed to the interposer, the sensor determining an error using a unique identification of the integrity mark corresponding to the each one page, the error is detected when at least one page of the monochrome output is interposed with the color output of a different print job;
   software for halting a print operation of the second monochrome printer upon detection of the error, the software purging at least remaining pages of the colored output corresponding to a spoiled one print job of the multiple jobs associated with the error; and, a print manager for generating a status report and marking the spoiled one print job corresponding to the error as spoiled on the status report;

wherein the each one print job is identified as being distinct from a remainder of the multiple jobs by the banner sheets separating the each one print job from the remainder multiple jobs.

2. The printing system of claim 1, wherein the each one print job is provided in PostScript.

3. The printing system of claim 2, wherein the print manager, responsive to the each one print job, prepends a set of PostScript operators to the each one print job; and wherein the splitter, responsive to the each one print job, parses the print job for a color set operator, wherein, upon identifying a color set operator on a page, the page is assigned to the first collective group such that all color pages in the multiple jobs are printed as a single print job.

4. The printing system of claim 1, wherein the multiple jobs includes multiple sets of print jobs, each one set of the multiple sets having at least one color page; wherein at least the color printer prints integrity marks on each page of the colored output.

5. The printing system of claim 4, wherein the integrity marks for the each one page further includes a page number and a total number of pages within the multiple jobs.

6. The printing system of claim 1, wherein the report includes a list of spoiled sets, a number of spoiled sets and a total number of sets in the multiple jobs.

7. The printing system of claim 1, further comprising a user interface responsive to the print manager for displaying information about the print job.

8. The method of claim 1, wherein the software further resumes printing to a next valid print job of the multiple jobs after purging the at least colored output corresponding to the spoiled one print job and before generating the status report.

9. A method for automatically printing a hybrid document parsing by a splitter multiple jobs into a first collective group of colored pages and a second group including monochrome pages segmented by tickets corresponding to each one job of the multiple jobs;

a first color printer for printing the first collective group to produce colored output and for printing a banner page identifying the each one job and an integrity mark on each one page of colored output;

placing the colored output in a feeder tray;

printing on a second monochrome printer monochrome output for the second group;

interposing using an interposer the colored pages into proper placement in the monochrome output to reassemble the each one print job of the multiple jobs;

sensing after an output path of the second monochrome printer the integrity marks on the each one page of the colored output as the colored output is fed to the interposer;

determining an error using a unique identification of the integrity marks, detecting the error when at least one page of the monochrome output is interposed with the color output of a different print job;

halting a print operation of he second monochrome printer upon detection of he error;

purging by software at least remaining pages of the colored output corresponding to a spoiled one print job of the multiple jobs associated with the error; and, generating a status report by a print manager, the print manager marking the spoiled one print job corresponding to the error as spoiled on the status report; and, identifying the each one print job separate from the multiple jobs by the banner sheets separating the each one print job from the remainder multiple jobs.

10. The method of claim 9, wherein the each one job of the multiple jobs is provided in PostScript.

11. The method of claim 10, further comprising:

prepending a set of PostScript set color operators at a front of the multiple jobs; and parsing the multiple jobs for a color set operator, wherein, upon identifying the color set operator on a colored page, assigning the identified page to the first collective group.

12. The method of claim 9, wherein the integrity mark for the each one page further includes a page number and total number of pages within the multiple jobs.

13. The method of claim 9, further including:

resuming printing to a next valid print job of the multiple job after purging the at least colored output corresponding to the spoiled one print job and before generating the status report.

* * * * *